United States Patent
Gawade et al.

(10) Patent No.: US 11,077,987 B2
(45) Date of Patent: Aug. 3, 2021

(54) STORAGE CONTAINER INCLUDING STORAGE COMPARTMENTS WITH ADJUSTABLE VOLUMES

(71) Applicant: GM Global Technology Operations LLC, Detroit, MI (US)

(72) Inventors: Tushar R. Gawade, Dhule (IN); Biswajit Tripathy, Bangalore (IN); Sujit Venugopal, Bengaluru (IN); Rajiv M. Nagarkatti, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 123 days.

(21) Appl. No.: 16/241,032

(22) Filed: Jan. 7, 2019

(65) Prior Publication Data

US 2020/0216223 A1    Jul. 9, 2020

(51) Int. Cl.
*B65D 51/18* (2006.01)
*B65D 25/06* (2006.01)
*B65D 43/14* (2006.01)
*B60R 5/00* (2006.01)

(52) U.S. Cl.
CPC ............... *B65D 25/06* (2013.01); *B60R 5/00* (2013.01); *B65D 43/14* (2013.01); *B65D 2525/284* (2013.01)

(58) Field of Classification Search
CPC .......... B65F 1/0046; B65F 1/04; B65D 25/06; B65D 25/04; B65D 43/14; B65D 2525/284; B65D 83/0454; B60R 5/00
USPC .............. 211/131.1, 163; 312/117, 125, 135, 312/249.7, 305; 220/507, 533, 909
See application file for complete search history.

(56) References Cited

U.S. PATENT DOCUMENTS 5,845,816 A * 12/1998 Krane .................... A47G 19/24
                                                           222/142.9
2016/0123786 A1 * 5/2016 Hanna .................. B65D 47/305
                                                            222/454

FOREIGN PATENT DOCUMENTS

| AT | 401119 B | 6/1996 |
|---|---|---|
| AT | 500112 A1 | 10/2005 |
| CN | 202269738 U | 6/2012 |
| EP | 0157245 A2 | 10/1985 |
| GB | 191221642 | * 2/1913 ............. A47F 5/025 |
| WO | 2005111954 A1 | 11/2005 |

* cited by examiner

Primary Examiner — James N Smalley
Assistant Examiner — Elizabeth J Volz

(57) ABSTRACT

A storage container having a locked position is disclosed, and includes a housing defining a cargo volume and an axis of rotation, a tubular member, a plurality of shelves, and a plurality of dividers. The tubular member is positioned along the axis of rotation and within the cargo volume of the housing. The tubular member defines one or more slots aligned with the axis of rotation. The shelves each define one or more engagement features that are each shaped to engage with a corresponding slot of the tubular member. A radially extending space is defined between a pair of shelves positioned directly adjacent to one another. The dividers that are each secured within a corresponding radially extending space when the storage container is in the locked position. Each of the shelves is configured to slide along the corresponding slot of the tubular member to adjust a volume the individual compartments.

19 Claims, 6 Drawing Sheets

STORAGE CONTAINER INCLUDING STORAGE COMPARTMENTS WITH ADJUSTABLE VOLUMES

INTRODUCTION

The present disclosure relates to a storage container. More particularly, the disclosure relates to a storage container including a plurality of storage compartments with adjustable volumes.

Many vehicles include a cargo area for storing various items such as, but not limited to, luggage, personal items, or groceries. For example, sedan-style automobiles may be equipped with a trunk. In another example, minivan sport utility vehicles may include two or more rows of seating, where a cargo storage area is located behind the last row of seating.

Sometime multiple passengers may share a vehicle together. For example, the multiple passengers may share a single vehicle when using a car-for-hire or ride-sharing service. The passengers may carry items that are too large to store on their lap or on the floor of the vehicle and therefore need to be stored in the cargo area of the vehicle. Some examples of items that are typically stored in the cargo area include, but are not limited to, sports equipment, shopping bags, or luggage. All of the items from each passenger are stored together in the cargo area of the vehicle. In fact, even if someone attempts to store his or her personal items in a separate portion of the cargo area, the personal items tend to slide around in the cargo area when the vehicle moves, makes a sudden stop, and turns. As a result, many personal items tend to intermingle with one another, which makes it difficult for a passenger to collect all of his or her belongs when they exit the vehicle.

Thus, while current cargo compartments achieve their intended purpose, there is a need for a new and improved system and method for storing items, especially items for individual passenger of a vehicle.

SUMMARY

According to several aspects, a storage container having a locked position is disclosed. The storage container includes a housing defining a cargo volume and an axis of rotation, a tubular member, a plurality of shelves, and a plurality of dividers. The tubular member is positioned along the axis of rotation and within the cargo volume of the housing and defines one or more slots aligned with the axis of rotation. The shelves each define one or more engagement features that are each shaped to engage with a corresponding slot of the tubular member. A radially extending space is defined between a pair of shelves positioned directly adjacent to one another. The dividers are each secured within a corresponding radially extending space when the storage container is in the locked position. The cargo volume is divided into individual compartments by intersections between the dividers and the shelves. Each of the shelves is configured to slide along the corresponding slot of the tubular member to adjust a volume of the individual compartments.

In another aspect of the disclosure, the storage container includes a deployed position. The dividers are each no longer positioned within the corresponding radially extending space when the storage container is in the deployed position.

In yet another aspect of the disclosure, the dividers are configured to rotate about the axis of rotation when the storage container is in the deployed position.

In still another aspect of the disclosure, rotating the dividers about the axis of rotation adjusts the volume of the individual compartments.

In another aspect of the disclosure, rotating the dividers about the axis of rotation either increases or decreases an overall number of individual compartments located within the storage container.

In yet another aspect of the disclosure, the storage container further comprises a plurality of annular members. Each of the annular members define an opening sized to receive the tubular member.

In still another aspect of the disclosure, the dividers each include a plurality of apertures that are each shaped to receive a cross-sectional area of one of the annular members.

In another aspect of the disclosure, the dividers rotate around the tubular member by sliding around the annular members when the storage container is in the deployed position.

In yet another aspect of the disclosure, the slots each extend lengthwise along a portion of an entire length of the tubular member.

In still another aspect of the disclosure, the slots each include an open end and a closed end.

In another aspect of the disclosure, the closed end of the slots act as a hard stop that prevents further movement of the shelves along the tubular member.

In yet another aspect of the disclosure, the housing includes a substantially cylindrical profile.

In still another aspect of the disclosure, cylindrical profile includes an upper end surface, a lower end surface, and a side surface. The side surface is located between the upper end surface and the lower end surface.

In another aspect of the disclosure, the tubular member is fixedly attached to at least one of the upper end surface and the lower end surface of the housing.

In one aspect of the disclosure, a storage container having a locked position and a deployed position is disclosed. The storage container includes a housing defining a cargo volume and an axis of rotation, a tubular member, a plurality of shelves, and a plurality of dividers. The tubular member is positioned along the axis of rotation and within the cargo volume of the housing. The tubular member defines one or more slots aligned with the axis of rotation. The shelves that each define one or more engagement features that are each shaped to engage with a corresponding slot of the tubular member. A radially extending space is defined between a pair of shelves positioned directly adjacent to one another. The dividers are each secured within a corresponding radially extending space when the storage container is in the locked position and are no longer positioned within the corresponding radially extending space when the storage container is in the deployed position. The dividers are configured to rotate about the axis of rotation when the storage container is in the deployed position. The cargo volume is divided into individual compartments by intersections between the dividers and the shelves. Each of the shelves is configured to slide along the corresponding slot of the tubular member to adjust a volume the individual compartments.

In another aspect of the disclosure, rotating the dividers about the axis of rotation adjusts the volume of the individual compartments.

In yet another aspect of the disclosure, rotating the dividers about the axis of rotation either increases or decreases an overall number of individual compartments located within the storage container.

In still another aspect of the disclosure, the storage container further comprises a plurality of annular members. Each of the annular members define an opening sized to receive the tubular member.

In another aspect of the disclosure, the dividers each include a plurality of apertures that are each shaped to receive a cross-sectional area of one of the annular members.

In yet another aspect of the disclosure, the dividers rotate around the tubular member by sliding around the annular members when the storage container is in the deployed position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
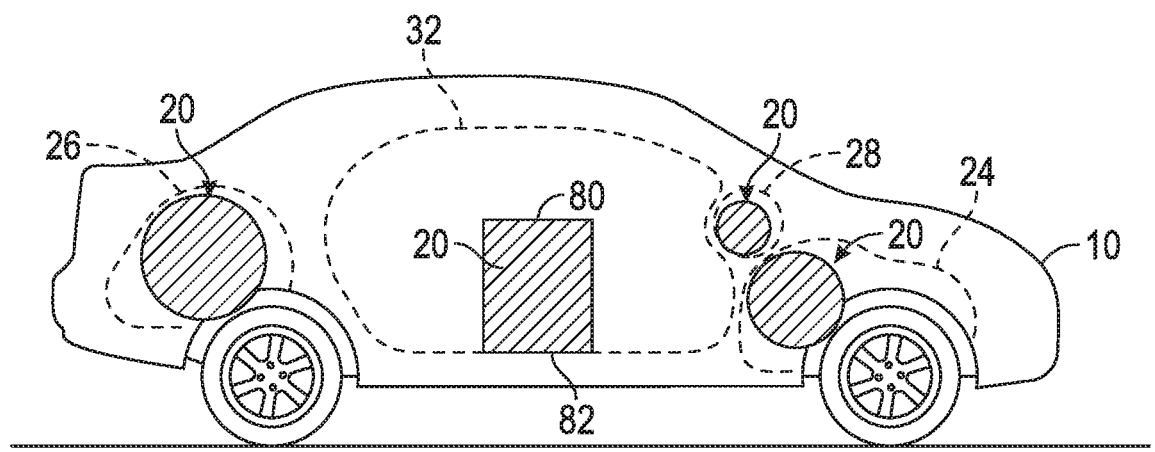
FIG. 1 is a schematic diagram of a vehicle illustrating the disclosed storage container in different cargo areas, according to an exemplary embodiment.

Referring to FIG. 1, a schematic diagram of a vehicle 10 having one or more storage containers 20 is illustrated. In one non-limiting embodiment, the storage container 20 is sized to fit within a cargo compartment of the vehicle 10. For example, the storage container 20 may be sized to fit within a front compartment 24, a rear compartment 26 or within an instrument panel storage space 28. Alternatively, the storage container 20 is sized to fit within in an interior cabin 32 of the vehicle 10. In an embodiment, the vehicle 10 may be a motor vehicle such as a passenger car, truck, sport utility vehicle, van, or motor home. In another embodiment, the vehicle 10 is an aircraft, ship or marine vessel, trolley car, or locomotive, and the storage container 20 is sized to fit within an overhead or floor mounted compartment in the main cabin. Although a motor vehicle and an aircraft are described, it is to be appreciated that the storage container 20 is not limited to use within a vehicle. Instead, the storage container 20 may be used in a variety of other applications. For example, the storage container 20 may be used in a store or shopping mall. Specifically, a customer may bring items to the front counter, since their personal items are not allowed inside of certain stores. In another example, the storage container 20 may be used in an amusement park or hotel, where luggage may be stored at the front counter or reception desk for a short period of time. In still another example, the disclosed storage container 20 may be used as storage in a railway station.

Figure 2:
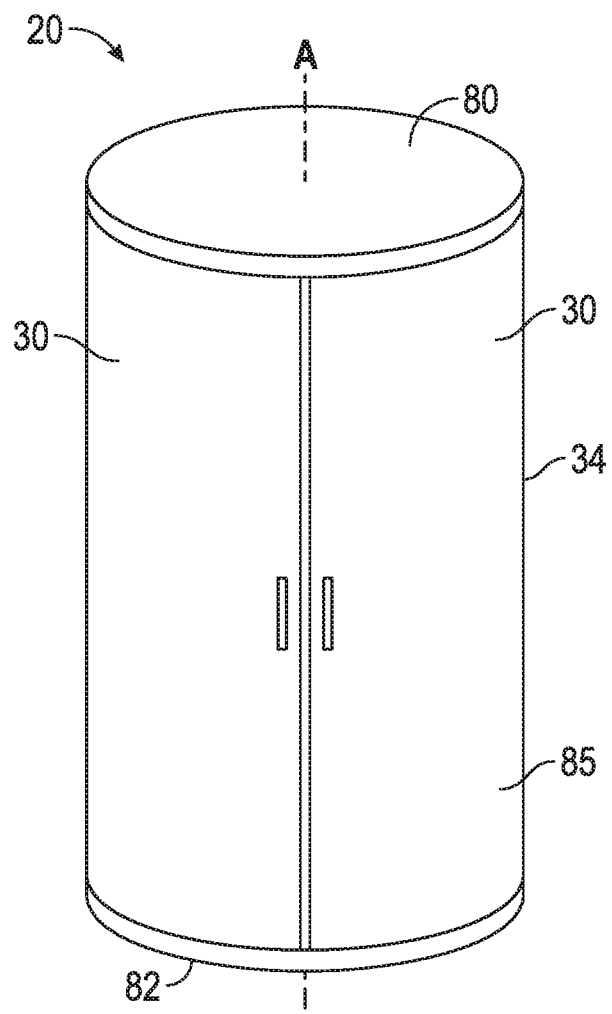
FIG. 2 is a perspective view of the storage container where a pair of doors are closed according to an exemplary embodiment.
Figure 3:
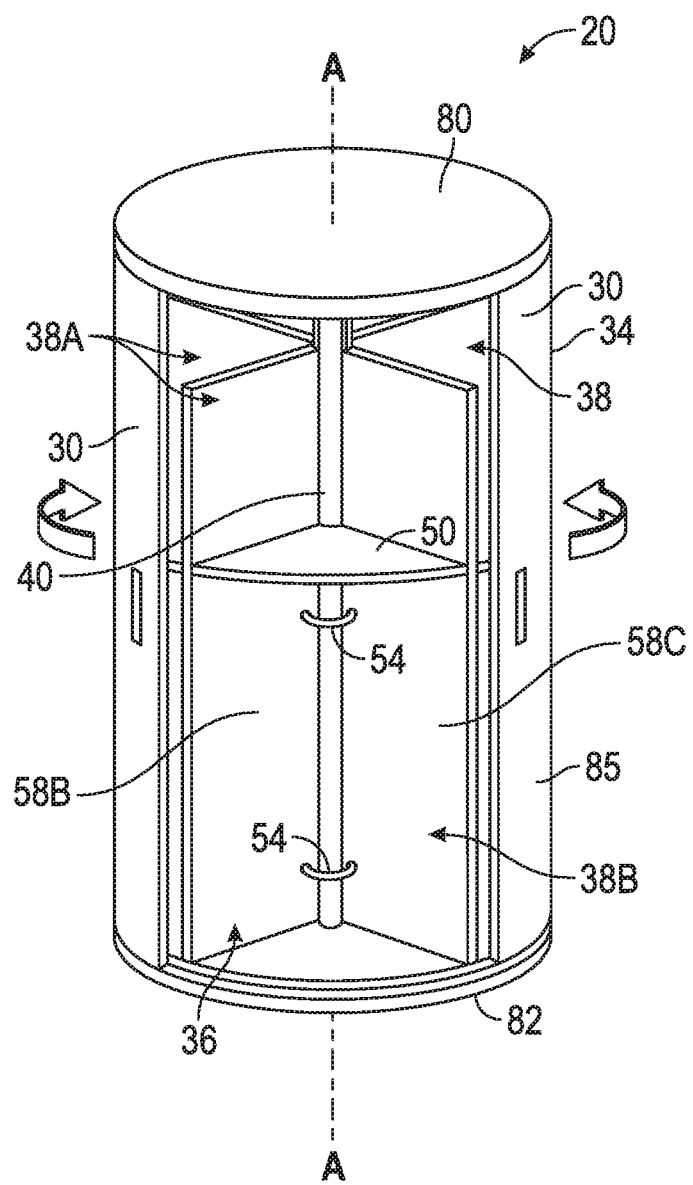
FIG. 3 is illustration of the storage container shown in FIG. 2, where the doors are in an open position and the storage container is in a locked position according to an exemplary embodiment.

FIG. 2 is a perspective view of the storage container 20 where a pair of sliding doors 30 are in a closed position, and FIG. 3 is a perspective view of the storage container 20 where the doors 30 are rotated in a direction away from one another and into an opened position. The housing 34 of the storage container 20 defines a cargo volume 36. As seen in FIG. 3, the cargo volume 36 is partitioned into a plurality of individual compartments 38. Therefore, each passenger of the vehicle 10 (FIG. 1) may store his or her personal items in one of the individual compartments 38 of the storage container 20.

In the event the storage container 20 is used in the vehicle 10, the individual compartments 38 may be used to store a passenger's personal items. For example, if the vehicle 10 is part of a car-for-hire or ride-sharing service, then each passenger may be assigned to his or her own individual compartment 38. Each individual compartment 38 is sized to hold items such as, for example, shopping bags, purses, or luggage. As explained below, the size or volume of each individual compartment 38 may be adjusted. Accordingly, if a passenger requires a larger storage space than one or more of the remaining passengers in the vehicle 10, the size of the individual compartments 38 may be adjusted to accommodate the specific storage needs of each passenger. For example, if one passenger only needs to store a small purse, while another passenger needs to store several shopping bags, then one of the individual compartments 38 is adjusted to be smaller in size to accommodate the purse, which is turn provides the space to another, larger individual compartment 38 that accommodates several shopping bags. In addition to the size of the individual compartments 38, the total number of individual compartments 38 may also be adjusted as well, and is explained in greater detail below.

Figure 4:
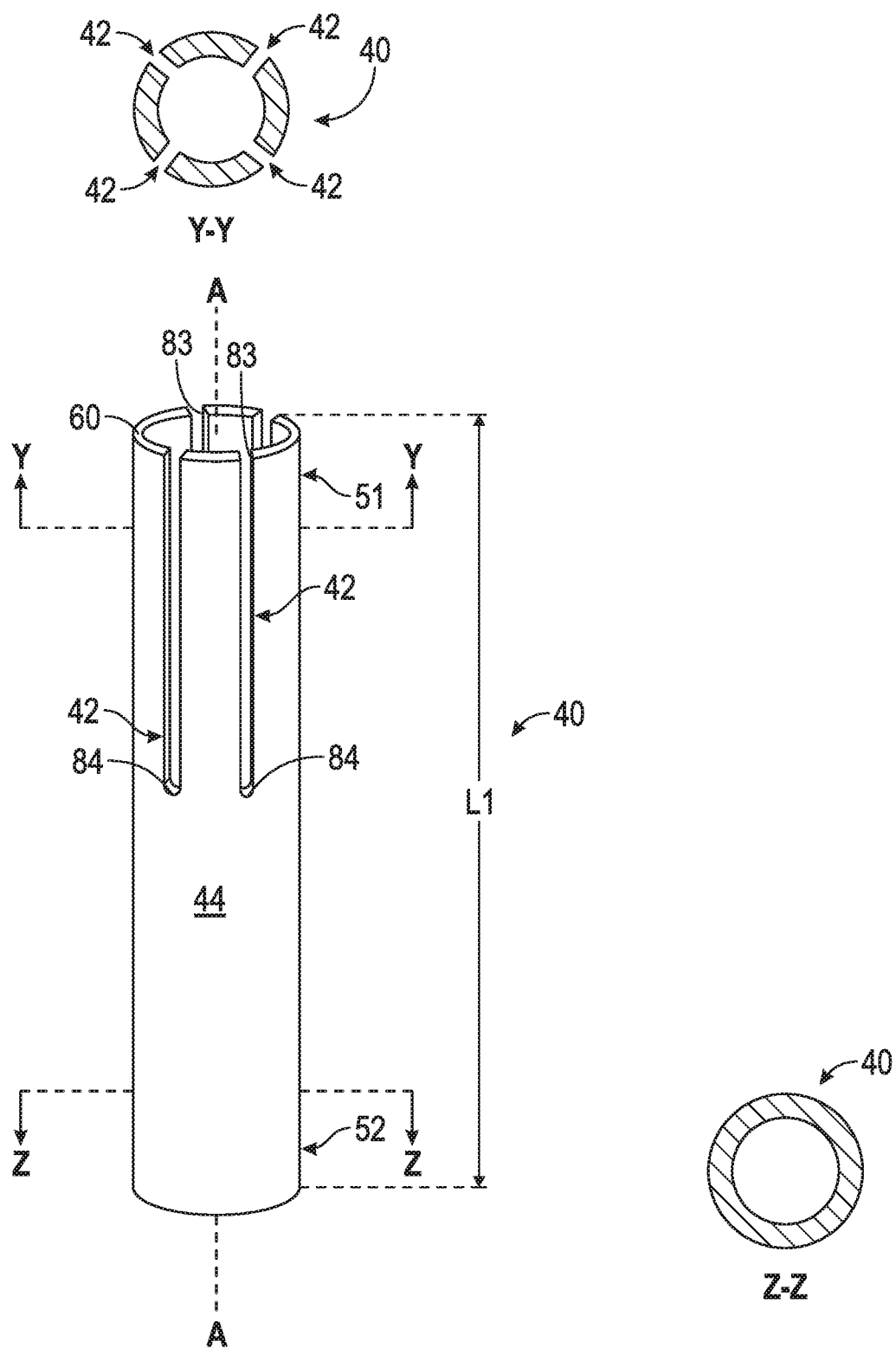
FIG. 4 is an illustration of a tubular member seen in FIG. 3, according to an exemplary embodiment.

Referring to both FIGS. 2 and 3, the housing 34 of the storage container 20 defines the cargo volume 36 and an axis of rotation A-A. A tubular member 40 (seen in FIG. 3) is positioned along the axis of rotation A-A and within the cargo volume 36 of the housing 34. As seen in FIG. 4, the tubular member 40 defines one or more slots 42 that are aligned with the axis of rotation A-A. The tubular member 40 is a hollow, elongated member 44 having a substantially cylindrical profile. The tubular member 40 is constructed of a rigid material such as, for example, metal. Section Y-Y is taken along an upper end portion 51 and Section Z-Z is taken along a lower end portion 52 of the tubular member 40. As seen in Section Y-Y, there are four slots 42 that are arranged equidistant from one another, however, it is to be appreciated that FIG. 4 is merely exemplary in nature. Indeed, the tubular member 40 may include any number of slots 42 arranged in a variety of configurations. The slots 42 each define a first open end 83 and a second closed end 84, where the open end 83 of the slots 42 are located along an upper end face 60 of the tubular member 40. The slots 42 each extend lengthwise along a portion of the entire length L1 of the tubular member 40. In an embodiment, the slots 42 may extend up to three-quarters of the entire length L1 of the tubular member 40.

Referring back to FIGS. 2 and 3, in one embodiment the pair of doors 30 are each rotated away from one another to open the storage container 20 and are rotated towards one another to close the storage container 20. In one embodiment, the storage container 20 may be locked to ensure privacy. The storage container 20 also includes plurality of shelves 50. The shelves 50 are each configured to engage with at least one slot 42 (FIG. 4) of the tubular member 40, which is explained in greater detail below. The storage container 20 also includes a plurality of dividers 58 that are arranged substantially transverse with respect to the shelves 50. The storage container 20 also includes plurality of annular members 54. In the embodiment as shown, the shelves 50 are oriented in a substantially horizontal orientation, while the dividers 58 are orientated in a substantially vertical position. However, it is to be appreciated that FIG. 3 is merely exemplary in nature, and other arrangements of the shelves 50 and the dividers 58 may be used instead.

Figure 5:
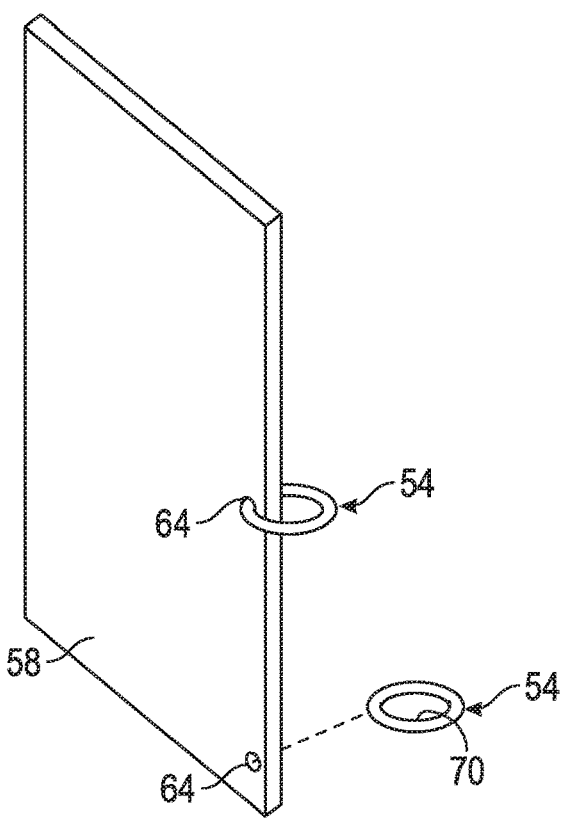
FIG. 5 illustrates a divider and annular members as seen in FIG. 3 according to an exemplary embodiment.
Figure 9:
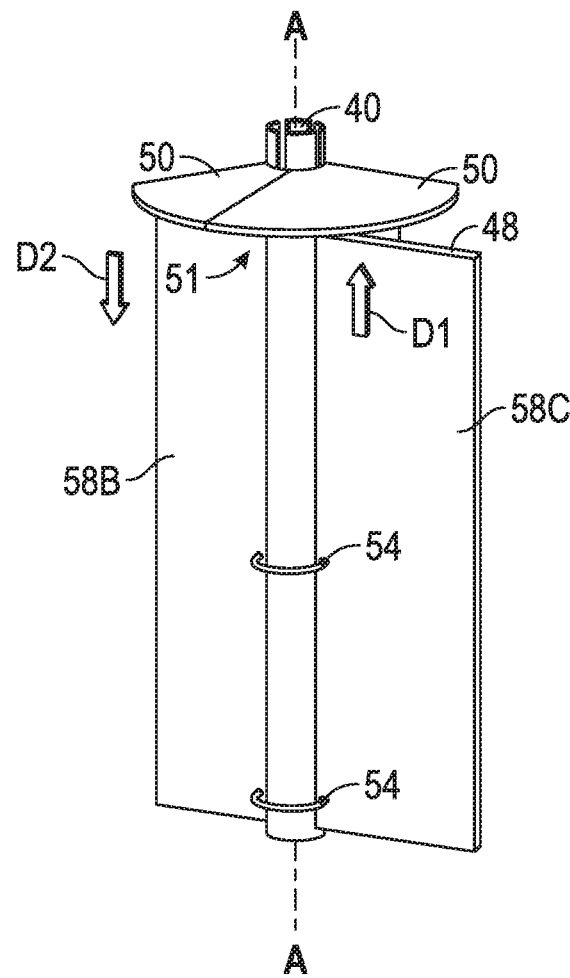
FIG. 9 is an illustration of the storage container in a deployed position, where the housing is omitted according to an exemplary embodiment.

FIG. 5 illustrates one of the dividers 58 and two annular members 54. Referring to both FIGS. 3 and 5, the dividers 58 are configured to rotate about the axis of rotation A-A, and around the tubular member 40 when the storage container 20 is placed into a deployed position, which is described below and is shown in FIG. 9. Specifically, each of the dividers 58 define a plurality of apertures 64. The apertures 64 are each shaped to receive a cross-sectional area of one of the annular members 54 (the apertures 64 are visible in FIG. 5). The annular members 54 include a ring-shaped profile and define an opening 70. Referring to both FIGS. 3 and 5, the opening 70 of the annular member 54 is sized to receive the tubular member 40 (which is seen in FIG. 3). The annular members 54 are positioned around the tubular member 40. Accordingly, when the storage container 20 is in the deployed position the dividers 58 rotate around the tubular member 40 by sliding around the ring-shaped profile of the annular members 54. In other words, the annular members 54 act as a guide that allows for the dividers 58 to rotate around the tubular member 40. However, when the storage container 20 is in a locked position, then the dividers 58 are held in place and are unable to move around the annular members 54. The locked position of the storage container 20 is shown in FIGS. 3, 6, and 7.

Referring to FIGS. 2 and 3, in the non-limiting embodiment as shown, the housing 34 is substantially cylindrical and includes opposing end surfaces 80, 82 and a side surface 85. Specifically, the housing 34 includes an upper end surface 80 and a lower end surface 82, where the side surface 85 is located between the upper end surface 80 and the lower end surface 82. The tubular member 40 is fixedly attached to at least one of the upper end surface 80 and the lower end surface 82. Thus, the tubular member 40 is fixedly attached to the housing 34 of the storage container 20. In one embodiment, the housing 34 may be used to provide a support surface. For example, in the embodiment as shown in FIG. 1, the housing 34 is placed within the interior cabin 32 of the vehicle 10 and is used as a table. Specifically, the upper end surface 80 of the storage container 20 acts as a table surface, while the lower end surface 82 acts as a ground support.

Figure 6:
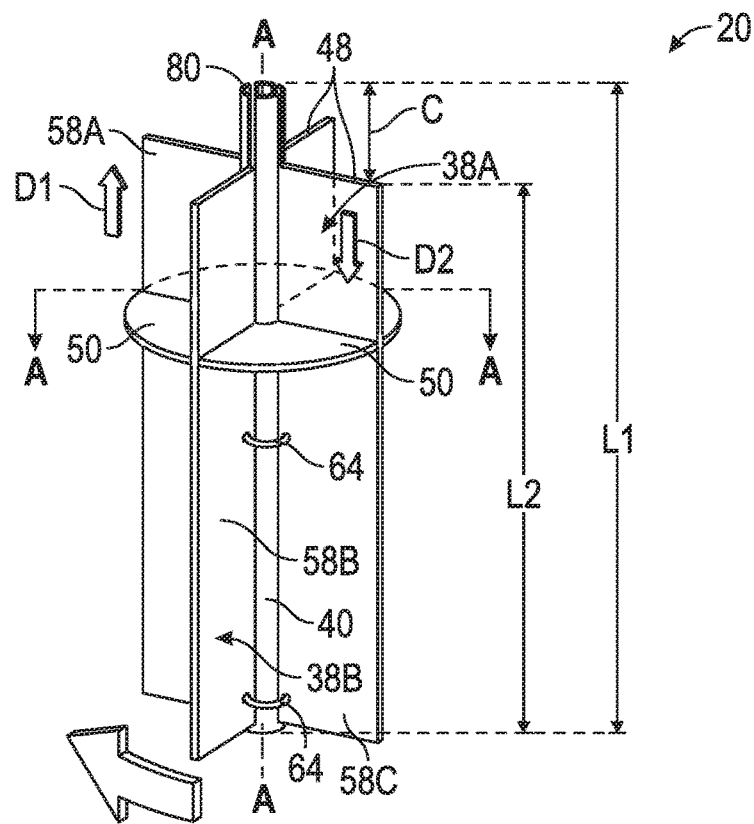
FIG. 6 is an illustration of the storage compartment shown in FIG. 3, where the housing is omitted according to an exemplary embodiment.

FIG. 6 is a perspective view of the tubular member 40, the shelves 50, and the dividers 58. It is to be appreciated that the housing 34 of the storage container 20 has been omitted from FIG. 6 for purposes of simplicity and clarity. Accordingly, the tubular member 40, the shelves 50, and the dividers 58 are not removeable from the housing 34 of the storage container 20. The dividers 58 each include a length L2. As seen in FIG. 6, the overall length L1 of the tubular member 40 is greater than the length L2 of the dividers 58. Thus, a clearance C exists between the upper end surface 80 of the tubular member 40 and an upper end surface 48 of the dividers 58.

Figure 7:
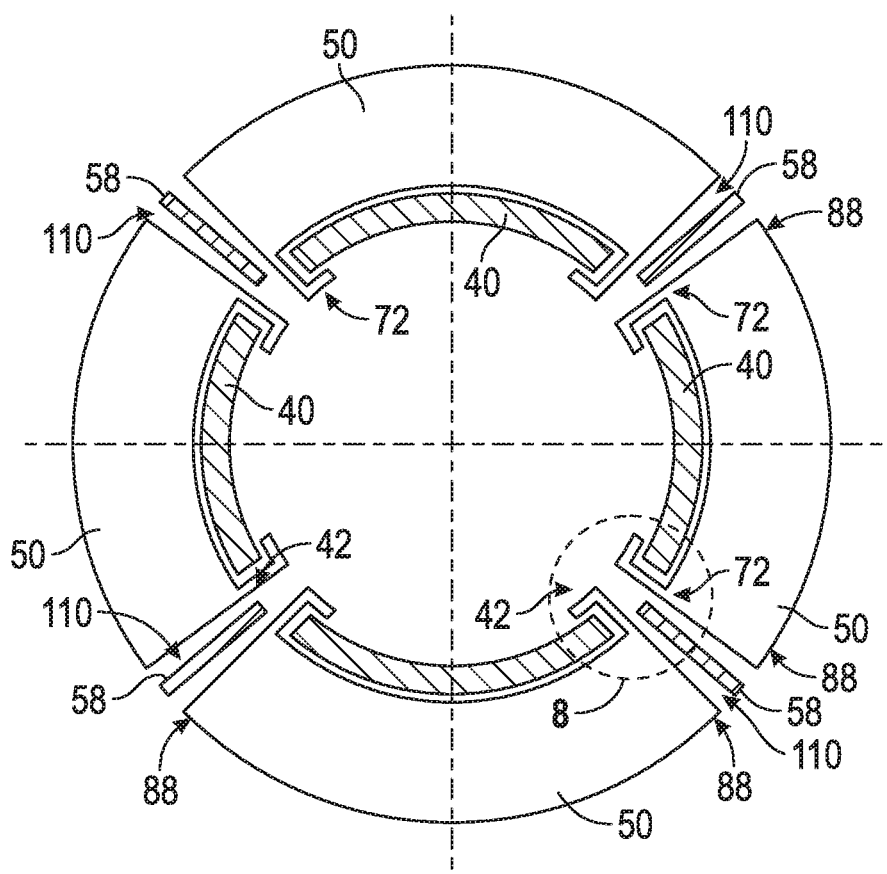
FIG. 7 illustrates Section A-A in FIG. 6 according to an exemplary embodiment.
Figure 8:
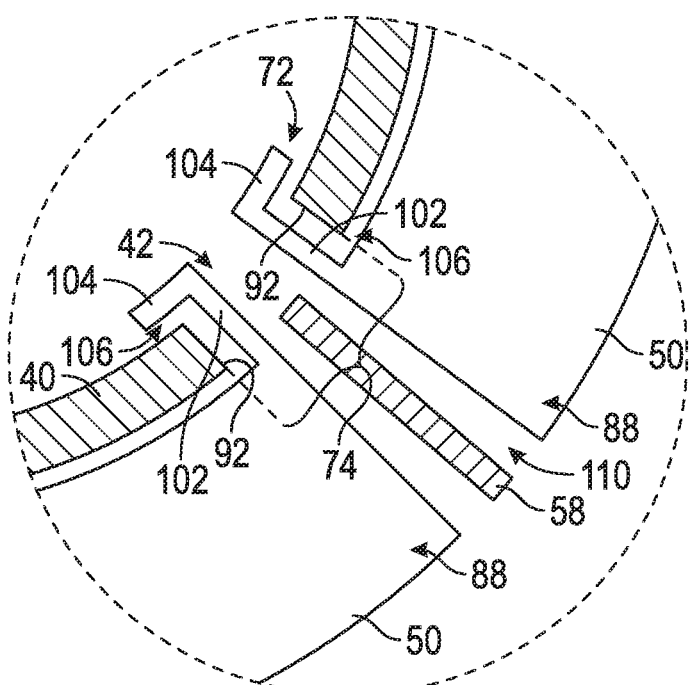
FIG. 8 is an enlarged view the container taken at Area 8 in FIG. 7 according to an exemplary embodiment.

FIG. 7 illustrates Section A-A shown in FIG. 6. Turning now to FIG. 7, each of the shelves 50 define one or more engagement features 72, where each engagement feature 72 is shaped to slidingly engage with a corresponding slot 42 of the tubular member 40. FIG. 8 is an enlarged view of Area 8 in FIG. 7, which shows one of the slots 42 of the tubular member 40, the corresponding shelves 50, and a divider 58 in detail. Referring to both FIGS. 7 and 8, each slot 42 of the tubular member 40 defines an empty space or gap 74 (labelled in FIG. 8). The gaps 74 are arranged around a circumference of the tubular member 40. In the embodiment as shown, the engagement feature 72 of the shelves 50 is a flange. Specifically, each shelf 50 includes two flanges located on opposite sides 88 of each shelf 50.

Referring specifically to FIG. 8, each slot 42 of the tubular member 40 defines two opposing ends 92 when viewed in cross-section. The flanges of the shelves 50 are each shaped to slidingly engage with an end 92 of a corresponding slot 42 of the tubular member 40. Accordingly, the shelves 50 are slidingly engaged with two slots 42 of the tubular member 40. Referring to FIG. 6, the shelves 50 are each configured to slide along the slots 42 in a direction that is parallel with respect to the length L1 of the tubular member 40. In other words, each shelf 50 is configured to slide in a linear direction that is parallel with the axis of rotation A-A of the dividers 58. However, the shelves 50 may only slide along a portion of the entire length L1 of the tubular member 40, since the closed ends 84 of the slots 42 (seen in FIG. 4) act as a hard stop that prevents further movement of the shelves 50 along the length L1 tubular member 40.

Referring to FIG. 8, in one non-limiting embodiment the engagement features 72 of each shelf 50 defines a first projection 102 and a second projection 104 that are arranged transverse with respect to one another. The first and second projections 102, 104 define a channel 106 that is shaped to correspond with an end 92 of one of the slots 42 of the tubular member 40. It is to be appreciated that the engagement features 72 may include any number of shapes and configurations, and the illustration as shown in the figures is merely one example of a slideable engagement between the shelves 50 and the tubular member 40.

Referring to both FIGS. 7 and 8, a radially extending space 110 is defined between a pair of shelves 50 that are positioned directly adjacent to one another. Specifically, the radially extending space 110 is defined by one of the opposing sides 88 of each shelf 50. The radially extending spaces 110 are each sized to accommodate one or more of the dividers 58. Specifically, in an embodiment, two or more dividers 58 may also be placed within the radially extending space 110. Each divider 58 is oriented in a direction that is substantially parallel with respect to the axis of rotation A-A, and the shelves 50 are each positioned transverse to the dividers 58. Accordingly, as seen in FIG. 7, the dividers are each secured within one of the radially extending spaces 110, and the storage container 20 is in the locked position.

It is to be appreciated that once a divider 58 is positioned in place within one of the radially extending spaces 110, the divider 58 may no longer substantially rotate around the tubular member 40 by sliding around the ring-shaped profile of the annular members 54 (seen in FIG. 5). In other words, the dividers 58 are held stationary by the shelves 50 when the storage container 20 is in the locked position.

Referring to FIG. 3, when the storage container 20 is in the locked position, the shelves 50 and dividers 58 are arranged transverse or substantially perpendicular to one another. The shelves 50 and the dividers 58 intersect one another to create the individual compartments 38. However, when the storage container 20 is in the deployed position, dividers 58 are no longer positioned within the radially extending spaces 110 between adjacent shelves 50 (FIG. 7). Thus, when the storage container 20 is in the deployed position, the dividers 58 are configured to rotate about the axis of rotation A-A.

Referring now to FIGS. 3, 4, and 5, the shelves 50 are configured to slide along one or more of the slots 42 of the tubular member 40 to adjust a volume of two of the individual compartments 38. For example, referring specifically to FIG. 3, the shelves 50 define in part a plurality of upper individual compartments 38A, which are located above a plurality of lower individual compartments 38B. Referring to both FIGS. 3 and 5, when one or more shelves 50 slide in an upward direction D1 (FIG. 6), the lower individual compartments 38B increase in size, while the upper individual compartments 38A decrease in size. Similarly, when one or more shelves 50 slide in a downward direction D2 (FIG. 6), the lower individual compartments 38B decrease in size, while the upper individual compartments 38A increase in size.

The size of the individual compartments 38 of the storage container 20 may also be adjusted by rotating the dividers 58 about the axis of rotation A-A. In the embodiment as shown in FIGS. 3, 6 and 7, the shelves 50 are in the locked position. The shelves 50 may be slid along the slots 42 of the tubular member 40 in the upward direction D1 and into a deployed position, which is shown in FIG. 9. When the shelves 50 are in the deployed position, the dividers 58 are no longer held in place. Thus, a user may rotate one or more of the dividers 58 around the annular members 54 to further adjust the size of the individual compartments 38 of the storage container 20.

Referring now to FIG. 9, when the storage container 20 is in the deployed position, the shelves 50 have been slid in the upwards direction D1 and are now located along the upper end portion 51 of the tubular member 40. More specifically, the shelves 50 are located above the upper end surfaces 48 of the dividers 58, and in the clearance area C (seen in FIG. 6). Accordingly, when the storage container 20 is in the deployed position, there are no intersections between the shelves 50 and the dividers 58. Therefore, the dividers 58 are now free to rotate about the axis of rotation A-A.

Referring now to FIGS. 6 and 9, a divider 58B is located between adjacent dividers 58A and 58C. The divider 58B is rotated about the axis of rotation A-A from the position seen in FIG. 6, and into the same position as the adjacent divider 58A. Therefore, the volume of one of the upper individual compartments 38A and lower individual compartments 38B has increased circumferentially. Furthermore, when the storage container 20 is in the configuration as shown in FIG. 6, there are eight total individual compartments 38. However, in the embodiment as shown in FIG. 9, there are now only six individual compartments 38. In other words, rotating the dividers 58 about the axis of rotation A-A adjusts the size of the individual compartments 38, and either increases or decreases an overall number of individual compartments 38 located within the storage container 20 as well.

Figure 10A:
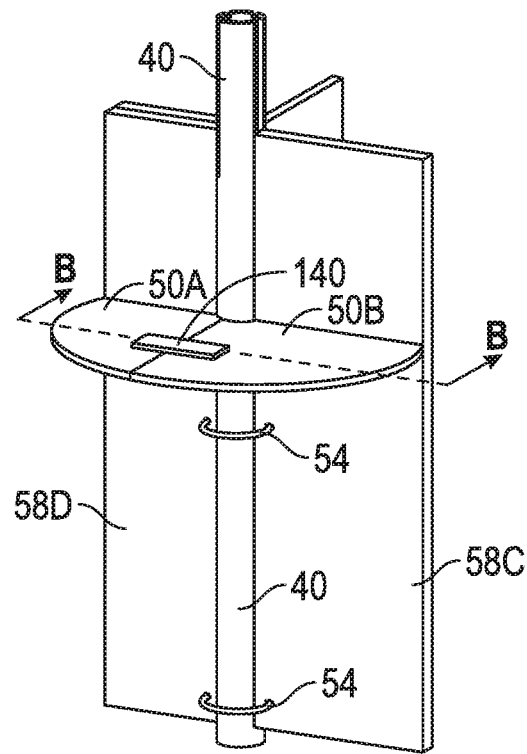
FIG. 10A is an illustration of the storage container in FIG. 9, where the shelves are placed back into the locked position according to an exemplary embodiment.
Figure 10B:
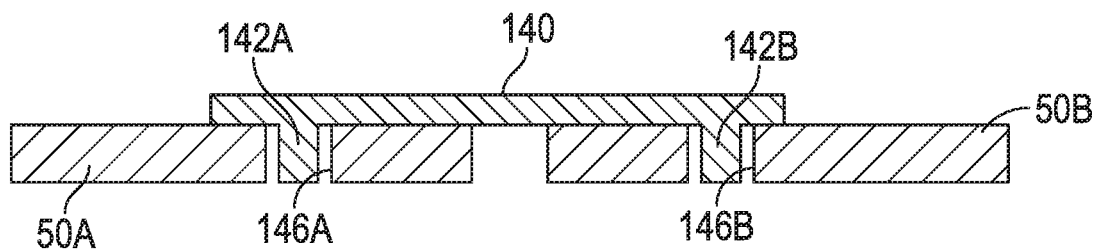
FIG. 10B illustrates Section B-B shown in FIG. 10A.

Once the divider 58B is placed in the position as seen in FIG. 9, the shelves 50 may then be slid in the downward direction D2 (FIG. 6), and back into the locked position, which is seen in FIG. 10A. Referring to FIG. 10A, now both dividers 58A and 58B are now located within one of the radially extending spaces 110 (seen in FIG. 7). As mentioned above, the radially extending spaces 110 are each sized to accommodate multiple dividers 58. Two adjacent shelves 50A and 50B may be held together with one another by an attachment device 140, which is positioned between both of the adjacent shelves 50A, 50B. FIG. 10B illustrates Section B-B, which illustrates a cross-section of both shelves 50A, 50B, and the attachment device 140. As seen in FIG. 10B, the attachment device includes two legs 142A, 142B. The leg 142A is received by a corresponding aperture 146A of the shelf 50A. Similarly, the leg 142B is received by a corresponding aperture 146B of the shelf 50B.

Referring generally to the figures, the disclosed storage container provides individual storage compartments for multiple individuals. Furthermore, the storage compartments may be adjusted in size to accommodate the storage needs of a particular individual or group of individuals. In some embodiments, the storage unit is sized to fit within a cargo area of a vehicle. For example, the storage container may fit within the front compartment, the rear compartment, the interior cabin, or an instrument panel storage space. Furthermore, the storage container also includes rotating doors that may be locked to ensure privacy. Therefore, personal items of multiple passengers in a vehicle may not intermingle with one another as the vehicle is traveling.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A storage container having a locked position, the storage container comprising:
    a housing defining a cargo volume and an axis of rotation;
    a tubular member positioned along the axis of rotation and within the cargo volume of the housing, wherein the tubular member defines one or more slots aligned with the axis of rotation;
    a plurality of shelves that each define one or more engagement features that are each shaped to engage with a corresponding slot of the tubular member, wherein a radially extending space is defined between a pair of shelves positioned directly adjacent to one another; and
    a plurality of dividers that are each secured within a corresponding radially extending space when the storage container is in the locked position, wherein the cargo volume is divided into individual compartments by intersections between the dividers and the shelves, and wherein each of the shelves is configured to slide along the corresponding slot of the tubular member to adjust a volume the individual compartments,
    wherein the storage container includes a deployed position, and wherein the dividers are each no longer positioned within the corresponding radially extending space when the storage container is in the deployed position.

2. The storage container of claim 1, wherein the dividers are configured to rotate about the axis of rotation when the storage container is in the deployed position.

3. The storage container of claim 2, wherein rotating the dividers about the axis of rotation adjusts the volume of the individual compartments.

4. The storage container of claim 2, wherein rotating the dividers about the axis of rotation either increases or decreases an overall number of individual compartments located within the storage container.

5. The storage container of claim 2, wherein the dividers each include a plurality of apertures that are each shaped to receive a cross-sectional area of one of the annular members.

6. The storage container of claim 5, wherein the dividers rotate around the tubular member by sliding around the annular members when the storage container is in the deployed position.

7. The storage container of claim 1, further comprising a plurality of annular members, wherein each of the annular members define an opening sized to receive the tubular member.

8. The storage container of claim 1, wherein the slots each extend lengthwise along a portion of an entire length of the tubular member.

9. The storage container of claim 8, wherein the slots each include an open end and a closed end.

10. The storage container of claim 9, wherein the closed end of the slots act as a hard stop that prevents further movement of the shelves along the tubular member.

11. The storage container of claim 1, wherein the housing includes a substantially cylindrical profile.

12. The storage container of claim 11, wherein cylindrical profile includes an upper end surface, a lower end surface, and a side surface, wherein the side surface is located between the upper end surface and the lower end surface.

13. The storage container of claim 12, wherein the tubular member is fixedly attached to at least one of the upper end surface and the lower end surface of the housing.

14. A storage container having a locked position and a deployed position, the storage container comprising:

a housing defining a cargo volume and an axis of rotation;

a tubular member positioned along the axis of rotation and within the cargo volume of the housing, wherein the tubular member defines one or more slots aligned with the axis of rotation;

a plurality of shelves that each define one or more engagement features that are each shaped to engage with a corresponding slot of the tubular member, wherein a radially extending space is defined between a pair of shelves positioned directly adjacent to one another; and a plurality of dividers that are each secured within a corresponding radially extending space when the storage container is in the locked position and are no longer positioned within the corresponding radially extending space when the storage container is in the deployed position, wherein the dividers are configured to rotate about the axis of rotation when the storage container is in the deployed position, and wherein the cargo volume is divided into individual compartments by intersections between the dividers and the shelves, and wherein each of the shelves is configured to slide along the corresponding slot of the tubular member to adjust a volume the individual compartments.

15. The storage container of claim 14, wherein rotating the dividers about the axis of rotation adjusts the volume of the individual compartments.

16. The storage container of claim 14, wherein rotating the dividers about the axis of rotation either increases or decreases an overall number of individual compartments located within the storage container.

17. The storage container of claim 14, further comprising a plurality of annular members, wherein each of the annular members define an opening sized to receive the tubular member.

18. The storage container of claim 14, wherein the dividers each include a plurality of apertures that are each shaped to receive a cross-sectional area of one of the annular members.

19. The storage container of claim 18, wherein the dividers rotate around the tubular member by sliding around the annular members when the storage container is in the deployed position.

* * * * *